(12) United States Patent
Trebbi et al.

(10) Patent No.: US 9,725,247 B2
(45) Date of Patent: Aug. 8, 2017

(54) APPARATUS FOR MOVING CONTAINERS

(71) Applicant: I.M.A. INDUSTRIA MACCHINE AUTOMATICHE S.P.A., Ozzano Dell' Emilia (IT)

(72) Inventors: Claudio Trebbi, Medicina (IT); Gabriele Gabusi, Castenaso (IT)

(73) Assignee: I.M.A. INDUSTRIA MACCHINE AUTOMATICHE S.P.A., Ozzano Dell' Emilia (IT)

( * ) Notice: Subject to any disclaimer, the term of this patent is extended or adjusted under 35 U.S.C. 154(b) by 0 days.

(21) Appl. No.: 14/385,018

(22) PCT Filed: Mar. 13, 2013

(86) PCT No.: PCT/IB2013/000368
§ 371 (c)(1),
(2) Date: Sep. 12, 2014

(87) PCT Pub. No.: WO2013/136157
PCT Pub. Date: Sep. 19, 2013

(65) Prior Publication Data
US 2015/0246777 A1    Sep. 3, 2015

(30) Foreign Application Priority Data

Mar. 14, 2012  (IT) .............................. MI2012A0399
Jul. 16, 2012  (IT) .......................... MI2012A001236

(51) Int. Cl.
*B65G 37/00*     (2006.01)
*B65G 21/20*     (2006.01)
*B65G 47/74*     (2006.01)
*B65G 25/08*     (2006.01)
*F26B 5/06*      (2006.01)
*F26B 25/00*     (2006.01)

(52) U.S. Cl.
CPC ............. *B65G 37/00* (2013.01); *B65G 25/08* (2013.01); *F26B 5/06* (2013.01); *F26B 25/003* (2013.01)

(58) Field of Classification Search
None
See application file for complete search history.

(56) References Cited

U.S. PATENT DOCUMENTS

| | | | | |
|---|---|---|---|---|
| 3,552,537 A | * | 1/1971 | Vamvakas ............ | B65G 47/715 198/442 |
| 5,129,162 A | | 7/1992 | Hemmersbach et al. | |
| 5,261,774 A | | 11/1993 | Le Froc'h et al. | |
| 6,328,153 B1 | * | 12/2001 | Manghi ................ | B65G 47/086 198/468.11 |

(Continued)

FOREIGN PATENT DOCUMENTS

| | | |
|---|---|---|
| EP | 0391208 | 10/1990 |
| EP | 0618417 | 10/1994 |

(Continued)

*Primary Examiner* — Kavel Singh
(74) *Attorney, Agent, or Firm* — Hamre, Schumann, Mueller & Larson, P.C.

(57) ABSTRACT

Apparatus for moving containers containing substances, comprising a plane, for the transport, movement and at least temporary storage of said containers, mobile along transit paths developing at least along an axis of movement to serve several machines or user devices.

15 Claims, 11 Drawing Sheets

(56) References Cited

U.S. PATENT DOCUMENTS

| | | | | |
|---|---|---|---|---|
| 7,607,531 B2 * | 10/2009 | Bonhomme | ....... | B65G 21/2072 |
| | | | | 198/442 |
| 7,695,230 B2 * | 4/2010 | Selch | ................... | B65G 1/0435 |
| | | | | 34/236 |
| 7,806,643 B2 * | 10/2010 | Friedman | .......... | H01L 21/67276 |
| | | | | 414/217 |

FOREIGN PATENT DOCUMENTS

| EP | 1619459 | 1/2006 |
|---|---|---|
| EP | 1717533 | 11/2006 |
| WO | WO 2005/121671 | 12/2005 |
| WO | WO 2007/131760 | 11/2007 |
| WO | WO 2011/015453 | 2/2011 |
| WO | WO 2011/045008 | 4/2011 |
| WO | WO 2013/064266 | 5/2013 |

* cited by examiner

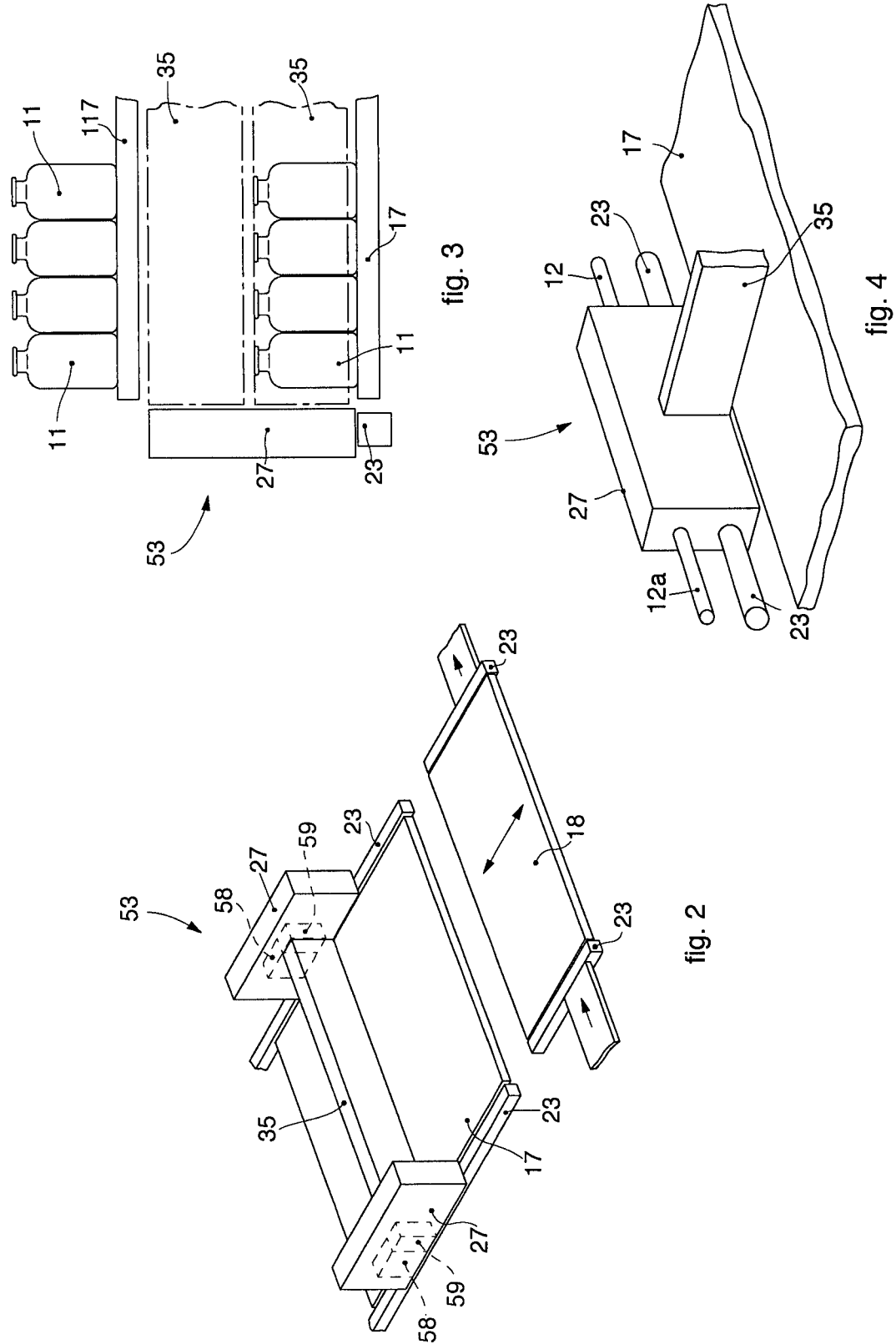

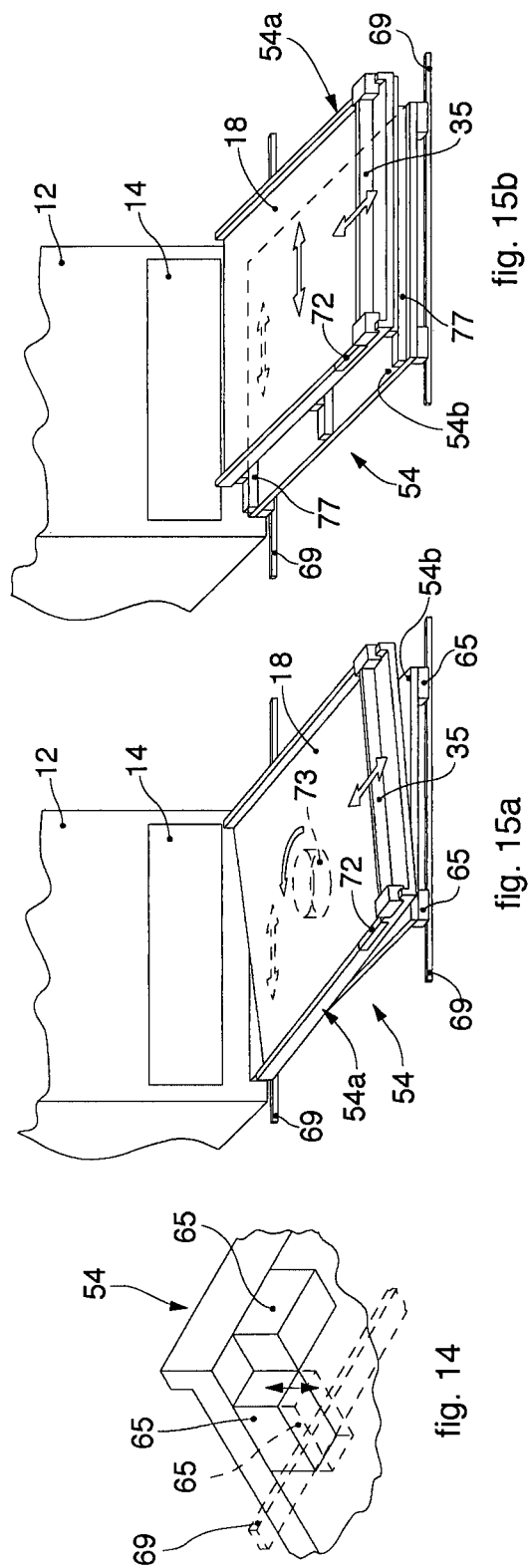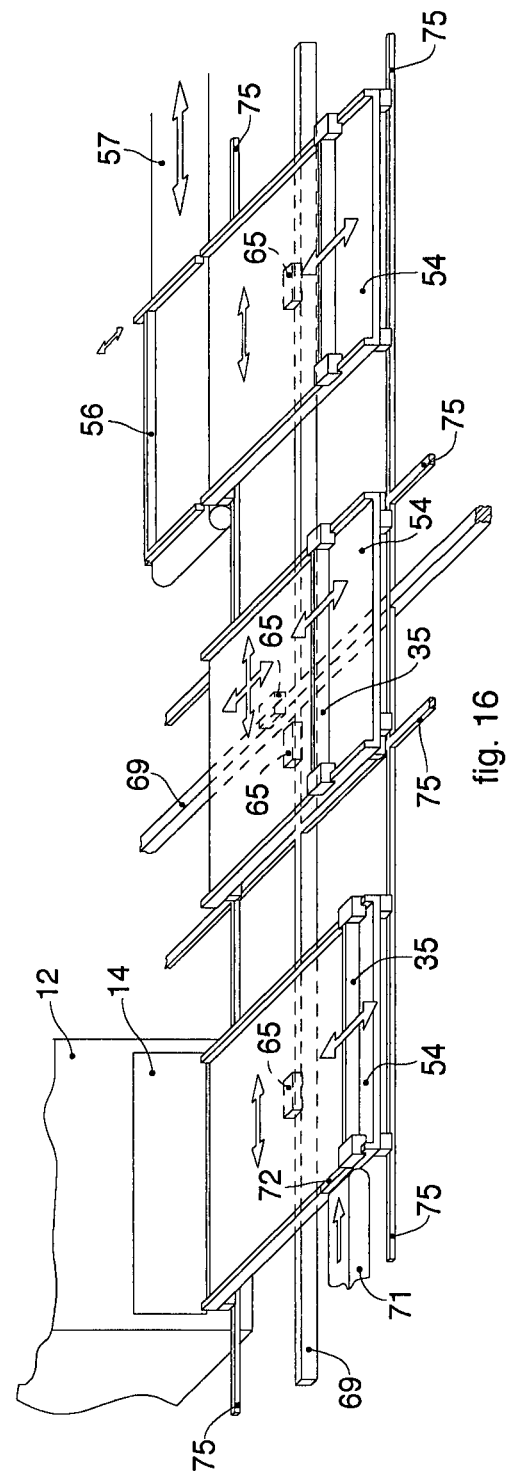

APPARATUS FOR MOVING CONTAINERS

FIELD OF THE INVENTION

The present invention concerns a movement apparatus that serves to load and/or unload products onto and/or from loading planes.

More precisely, the movement apparatus according to the present invention is suitable to load and unload one or more rows of containers simultaneously, advantageously, but not only, containers inside which a substance may be present.

According to one application, the invention is applied in relation to lyophilization and/or sterilization machines.

According to a secondary application, variants of the invention are applied in relation to planes to transport, move and store containers for pharmaceutical or food use, suitable to collaborate in one or more operating functions.

BACKGROUND OF THE INVENTION

It is known that a lyophilization and/or sterilization machine is a complex device where the product is transformed, inside a processing chamber, for example a lyophilization and/or sterilization chamber, into a substance that maintains the characteristics of the original product, but without water.

A lyophilization and/or sterilization machine generally comprises said processing chamber, inside which at least a loading plane is disposed, on which the containers are leaned and disposed, generally in an ordered manner, and in which the substances contained therein are subjected to lyophilization and/or sterilization.

There is also normally a movement apparatus present, the function of which is to load and/or unload the loading plane, and possibly another displacement apparatus located in front of the processing chamber, the function of which is to position the containers that will then be loaded onto the loading plane, and also to discharge them once they have been removed from the loading plane.

There is also a preparation plane present, fixed or mobile in relation to the loading plane, onto which the containers arrive for loading or unloading the loading plane.

One or more rows of containers to be introduced into said lyophilization chamber are normally organized on the preparation plane. Moreover, the rows of containers exiting from the lyophilization chamber are progressively taken onto the same preparation plane, to be sent elsewhere.

A processing chamber of the type in question also has at least a sealing door, which separates the chamber from the surrounding environment.

A lyophilization and/or sterilization machine normally works at low temperatures, even as low as around −50° C.

The pressures that can be reached in the lyophilization and/or sterilization chambers can also reach 0.3 mbar.

In some exceptions, such machines can reach high temperatures. Machines are also known that can reach as much as 140° C. and more, to perform the sterilization.

Machines are known which perform functions of lyophilization and sterilization.

Hereafter, and in the claims, the term lyophilization machine will include both a lyophilization machine, a sterilization machine and a lyophilization and sterilization machine.

Given the pressures and temperatures at which a processing chamber, for example a lyophilization chamber, can work, it is quite clear how important it is to ensure that said machine has no infiltrations or thermal or fluid bridges, even if controlled.

Given the products that are to be transported therein, it is also necessary that there are means present that cannot be subjected, directly or indirectly, to leakages and/or the production of powders and/or pollutant products. It is therefore necessary that said chambers do not have inside them, either temporarily or permanently, structures that in themselves generate powders and/or pollutant products, or suffer leakages or heat bridges.

It is therefore important that, inside it or in temporary connection with the inside, the lyophilization machine has the lowest number of elements that can affect the power required, the cycle times and the contamination of the environment inside the machine.

Furthermore, since the products treated inside the containers can be substances used for pharmaceuticals or food, there must not be sources of pollutants, contaminating products or powders inside the processing chamber, nor must there be energy sources, electric or magnetic or other type of sources that can or could interact with one or another of the substances in the containers.

It is known to provide that the lyophilization chamber cooperates with one or two thruster bars that thrust rows of containers to be subjected to, or already subjected to lyophilization, inside or outside. The bars are driven by thrusters or drive means that extend outside the lyophilization machine.

These solutions not only generate and/or maintain possible communication paths between the outside and the inside of the processing chamber, but also generate possible powders or pollutant substances, so that they require controls and connected cleaning cycles that are frequent and costly.

For certain loading and/or unloading operations of the containers onto/from the loading plane, it is also known to use a robot having several degrees of freedom of movement. In this case the chamber, for example lyophilization chamber, is not affected by external factors during the lyophilization cycle, but large bulks are affected in front of the access compartment for the installation and movement of the robot, creating a useless occupation of space and problems during cleaning and maintenance. Such problems increase overall times and therefore affect the processing cycles.

Devices are also known for moving containers for lyophilization machines that allow to load and unload containers by thrusting them, from loading planes inside the processing chamber, but which have the disadvantage that they remain at least partly inside the chamber also during the processing. This entails frequent maintenance operations and cleaning of such devices because, since they remain in the processing chamber, they are subjected to potentially damaging work conditions, and also because they introduce a risk factor for the contamination or dirtying of the processing chamber.

Systems are also known that include cars, which sweep the planes where the containers are amassed, so as to load and unload the containers. These known cars are driven by linear motors whose positive part acts on the negative part of the linear motor. The linear motors extend both inside and outside the processing chamber.

If the active part of the active linear motors is fixed inside the processing chamber, possible magnetic forces, continuous or residual, are inadmissible when there are certain substances present in the containers.

One purpose of the present invention is to obtain a movement apparatus, suitable to load and/or unload products on loading planes, so that once the plane or planes has/have been loaded, the movement apparatus does not remain confined inside the processing chamber, for example the lyophilization and/or sterilization chamber, at the same time maintaining a compact and limited configuration of the service spaces inside the chamber.

Another purpose of the present invention is to obtain a movement apparatus that does not require frequent maintenance interventions or cleaning cycles for the lyophilization and/or sterilization machine.

Another purpose of the present invention is to simplify both the steps of maintenance and cleaning of the lyophilization and/or sterilization machine.

Another purpose of the present invention is to obtain a movement apparatus that does not generate pollutant products during the loading and/or unloading and transport steps.

Another purpose of the invention is to obtain a movement apparatus that is reliable and precise in moving the containers, that has a movement as consistent as possible with the desired trajectories and that is easily adjustable and alignable even during use.

Another purpose is to prevent devices or parts of devices from remaining inside the processing chamber that generate or emit magnetic, electric or other type of forces, even only in residual form.

Another purpose of the present invention is to obtain an autonomous movement apparatus.

Another purpose of the present invention is to obtain a movement apparatus that can be managed by a station also disposed at a certain distance from the machine, and possibly can be managed automatically.

Another purpose of the present invention is to obtain a movement apparatus that can be managed by control and management means.

Another purpose of the present invention is to obtain a movement apparatus suitable to transfer itself on, and operate with, a movement and transport and at least temporary storage plane.

Another purpose is to obtain a movement and transport plane, temporally operating on the front of the lyophilization and/or sterilization machine and suitable to cooperate with other machines and/or operating stations according to desired sequences.

Another purpose is to obtain a movement, transport and at least temporary storage plane which uses one or more autonomous movement apparatuses.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, forms of embodiment described here concern a lyophilization and/or sterilization machine provided with a processing chamber associated with a sealing door. The machine provides a movement apparatus according to the present invention, which overcomes the limits of the state of the art and eliminates the defects found therein, used particularly but not exclusively for loading and/or unloading, on suitable planes of the machine, containers containing substances to be lyophilized and/or sterilized.

According to a variant of the invention, the movement apparatus is also suitable to cooperate with a transport, movement and at least temporary storage plane, hereafter, for brevity, transport plane.

According to another variant, the transport, movement and at least temporary storage plane is equipped with its own movement apparatus according to the present invention.

According to the invention, a preparation plane is provided, on which the containers arrive for loading or unloading, which is equipped with the movement apparatus according to the present invention and which becomes a transport, movement and at least temporary storage plane.

According to the present invention, the movement apparatus comprises guide means that extend at least partly inside and outside the processing chamber.

The guide means are arranged at least on one side of the loading plane.

In some forms of embodiment, the guide means are configured to cooperate with at least a mobile slider consisting of at least a slider mean.

Between the guide mean and the mobile slider, movement means are provided, for the desired and controlled displacement of the mobile slider. The mobile slider may include drive means to drive at least the movement means and energy supply means suitable to feed the drive means. The drive means and energy supply means are provided directly on board the mobile slider.

According to another variant, second guide means, or transit means, extend as far as other work stations, allowing the transport, movement and at least temporary storage plane to cooperate with the other work stations too, said plane being equipped with its own movement means.

According to a variant, the guide means are arranged at the two sides of the loading plane.

The guide means according to the present invention cooperate with the sealing door associated with the processing chamber. This cooperation can be achieved in a fixed interruption, that is, an interruption that is achieved when the sealing door is closed.

A variant provides that the guide means extend on the transport, movement and at least temporary storage plane which can cooperate directly or indirectly with the entrance mouth of the lyophilization machine and with one or more operating units or stations.

According to a first variant, the guide means are fixed.

According to a second variant, the guide means have, or are equipped with, drawing means.

At least one slider mean cooperates with the guide means, and contains the movement apparatus which, in the case of the first variant, that is, with fixed guide means, include movement means able to overcome the possible interval present in the guide means.

In the case of guide means located at the two sides of the loading plane, according to the present invention there are respective slider means present at least one of which contains a movement apparatus.

The transport, movement and at least temporary storage plane according to a variant has autonomous positioning and displacement means.

In the case of the transport, movement and at least temporary storage plane, movement apparatuses are present in the plane itself, or are at least temporarily associable with the plane.

According to a first solution, in the case of two slider means, the slider means are connected by mechanical or electronic collimation means, so as to align them and make them parallel so that they move in a coordinated manner. The collimation means can be, for example, optical, laser, encoders or any other type.

In the second variant solution, that is, with guide means equipped with drawing means, when the guide means are located at the two sides of the loading plane, or on one side only, at least one of the guide means has drawing means, such as a belt or screw, or magnetic or suchlike, which cooperate with means on the slider mean so as to supply the desired and controlled displacement to the slider mean.

According to a variant, in the case of two slider means that move along the guide means, the slider means are independent.

According to one feature of the present invention, in the case of two slider means, in cooperation between guide means and slider means, there are movement means that generate the movement of the slider mean along the guide means in a controlled and autonomous manner.

According to one formulation of the invention, in the case of one slider mean, the slider mean is provided with drawing rod means.

According to the variant of the two slider means, the slider means can cooperate in relation to at least one drawing rod mean.

According to a variant, in the case of two independent slider means, each cooperates with its own drawing rod mean.

Hereafter, whether it is a single slider mean or two slider means, collimated or mobile individually, when they are completed by the drawing rod, they constitute the mobile slider.

According to a secondary feature, in the case where at least one of the guide means has its own movement means, the movement means are provided with means that are associated with the slider mean in order to generate the controlled advance and retreat of the mobile slider along the guide means.

According to a variant, the slider mean is provided with wheels that possibly cooperate with a closed-ring track-type movement mean.

According to another variant, instead of the closed ring the movement means consist of several wheels, advantageously at least three.

According to another variant, the wheels are at least marginally pivoting horizontally so as to follow any possible lack of linearity in the respective guide means and/or to facilitate passage beyond the possible interval present therein.

According to one feature of the present invention, at least one wheel of the movement means is a drive wheel.

The drawing rod mean, or drawing rod, has two positions of interference with the containers to be moved, a front one and a rear one, so that the rear position is advantageously the thrust position of the containers on the loading plane. The front position is advantageously the unloading position.

According to a variant, the drawing rod has at least two positions, which are obtained by positioning it vertically, or by making it rotate around an axis of rotation.

The first position is such that the drawing rod is positioned in a high position, that is, where it does not interfere with the containers.

The second position is such that the drawing rod is positioned in a position of interference with the containers, so that it is able to draw them into or extract them from the loading plane.

The high position allows the slider means to move along the sides of the loading plane, or the preparation plane, or the transport plane, or on the guide means, without interfering with the containers present there.

According to one form of embodiment, the slider mean is driven by at least a rotary cable, possibly of the type that slides between protective sheaths and able to cooperate with a distributor, which possibly selects the motion, present in the slider mean.

According to a variant, two rotary cables are present, one of the cables being suitable to supply motion to advancement means that advance the mobile slider and the other suitable to drive the positioning means of the drawing rod.

Remote means drive the rotation of the cables and control the angular position thereof.

According to another form of embodiment, the mobile slider is driven by at least one drive mean which can be electric, mechanical or magnetic.

According to a variant, the electric or magnetic motor is fed by a corresponding electric cable, which can possibly also carry control and command functions.

According to another variant, the electric motor is driven by batteries, or electric energy accumulators or other rechargeable sources of electric energy, located on board the mobile slider.

In other variants, in the case of a mechanical motor, it can be fed by spring means or suchlike, suitable to accumulate releasable mechanical energy.

According to a variant, remote command means, for example a cable or radio wave or other mean, activate selector means present in the mobile slider that allow the electric motor to drive the drive wheels and/or the drawing rod.

According to another variant, an electric or mechanical motor operates to position the drawing rod.

According to a first form of embodiment of the invention, the electric and/or mechanical motor is a motor with a rotation shaft to transfer motion.

According to another form of embodiment of the invention, the electric motor is a magnetic linear motor.

According to a first variant, the slider mean is associated directly to, or is the magnetic linear motor.

According to another variant, the slider mean slides in relation to a magnetic linear motor, which at least partly constitutes the guide means.

According to a variant, instead of the magnetic linear motor a track may be provided, or a screw, or again similar or comparable means, which induce the desired and controlled movement in the mobile slider and which are driven by drive means cooperating with the guide means.

In the case of energy sources on board the mobile element, means to recharge the energy sources are provided in relation at least to the stand-by position that characterizes the mobile element during the lyophilization cycle.

The spirit of the invention provides both that control, command and management means are present, and also, as a variant, that on board the mobile slider there is a control and command unit that dialogs with the control, command and management means located elsewhere, or the control and command unit itself constitutes control, command and management means.

The control and command unit is able to recognize its own position, that is, the unit or place where the mobile slider or the transport plane is.

According to the invention, the mobile slider can transfer on the movement, transport and at least temporary storage plane, or transport plane, in order to cooperate therewith, in the operating positions where said plane is translated for loading and/or unloading, totally or partially, the containers present on said plane or to be positioned on said plane.

According to the invention, the movement and transport plane can have fixed guides or guides that have means to move the mobile slider.

Furthermore, other forms of embodiment concern a movement apparatus to move containers containing substances that comprise transit paths developing at least along an axis of movement to serve several machines or user devices, and at least a movement and transport and at least temporary storage plane for the containers, which is provided with autonomous slider-type movement means to move the transport plane along the transit paths, and with energy supply means to feed the slider-type movement means.

The present invention also concerns a plant comprising a plurality of machines or user devices to receive or supply containers containing substances and a movement apparatus as described here.

According to other forms of embodiment, the present invention also concerns a movement apparatus suitable to be used in association with a lyophilization and/or sterilization machine, to thrust containers to be processed onto at least a loading or processing plane positioned inside a lyophilization or processing chamber, and to pick up the containers from said plane at the end of processing.

In some variant embodiments, the movement apparatus comprises at least a linear motor that moves, at least for a segment of the travel, a mobile slider or thruster car, both inside and outside the processing chamber in a desired direction, normally parallel to the loading plane and along its axis.

In particular, according to one form of embodiment the mobile slider cooperates with travel paths, each at least partly defined by a component of linear motor, to move the containers from a preparation plane at the front of the machine to the loading plane present in the processing chamber and vice versa.

In variant forms of embodiment, the mobile slider comprises another component of the linear motor with respect to the component that defines the travel paths.

It comes within the spirit of the invention that part of the travel path inside the processing chamber is the active part of a linear motor and that the mobile slider comprises the passive part of the linear motor, or that the part of the travel path inside the processing chamber is the passive part of the linear motor, and that the mobile slider comprises the active part of the linear motor.

Moreover, in a variant form of embodiment it is possible that the part of the travel path inside the processing chamber is a supporting and sliding travel path, and that the mobile slider comprises rolling means driven by an electric or mechanical drive mean.

According to possible implementations of the present invention, the linear motor cooperates with position control means, such as for example encoder-type position detector means, to determine the position of the mobile slider.

In the case of two linear motors that operate at one end and the other of the mobile slider, the control means also manage the parallelism or non-parallelism of the two sides of the mobile slider, and cooperate to align or misalign them.

In the case where the substances in the containers are magneto-sensitive or sensitive to electric fields, the car is moved outside the processing chamber by the linear motors and inside the processing chamber by temporary movement means, such as rotary electric motors or alternatively by mechanical systems driven by rotary cables driven from outside, said temporary movement means being on board the thruster car.

BRIEF DESCRIPTION OF THE DRAWINGS

These and other characteristics of the present invention will become apparent from the following description of some schematic forms of embodiment, given as a non-restrictive example with reference to the attached drawings wherein:

FIG. 2 is a schematization of a movement apparatus according to the present invention;

FIG. 3 is a variant of the solution in FIG. 2;

FIG. 4 is another variant of the solution in FIG. 2;

FIG. 14 shows a possible form of embodiment of a detail of FIG. 13;

FIGS. 15a and 15b show other possible variants of the movement apparatus according to the present invention;

FIG. 16 shows other forms of embodiment of the mobile slider in relation to a transport plane;

DETAILED DESCRIPTION OF SOME FORMS OF EMBODIMENT

Figure 1:
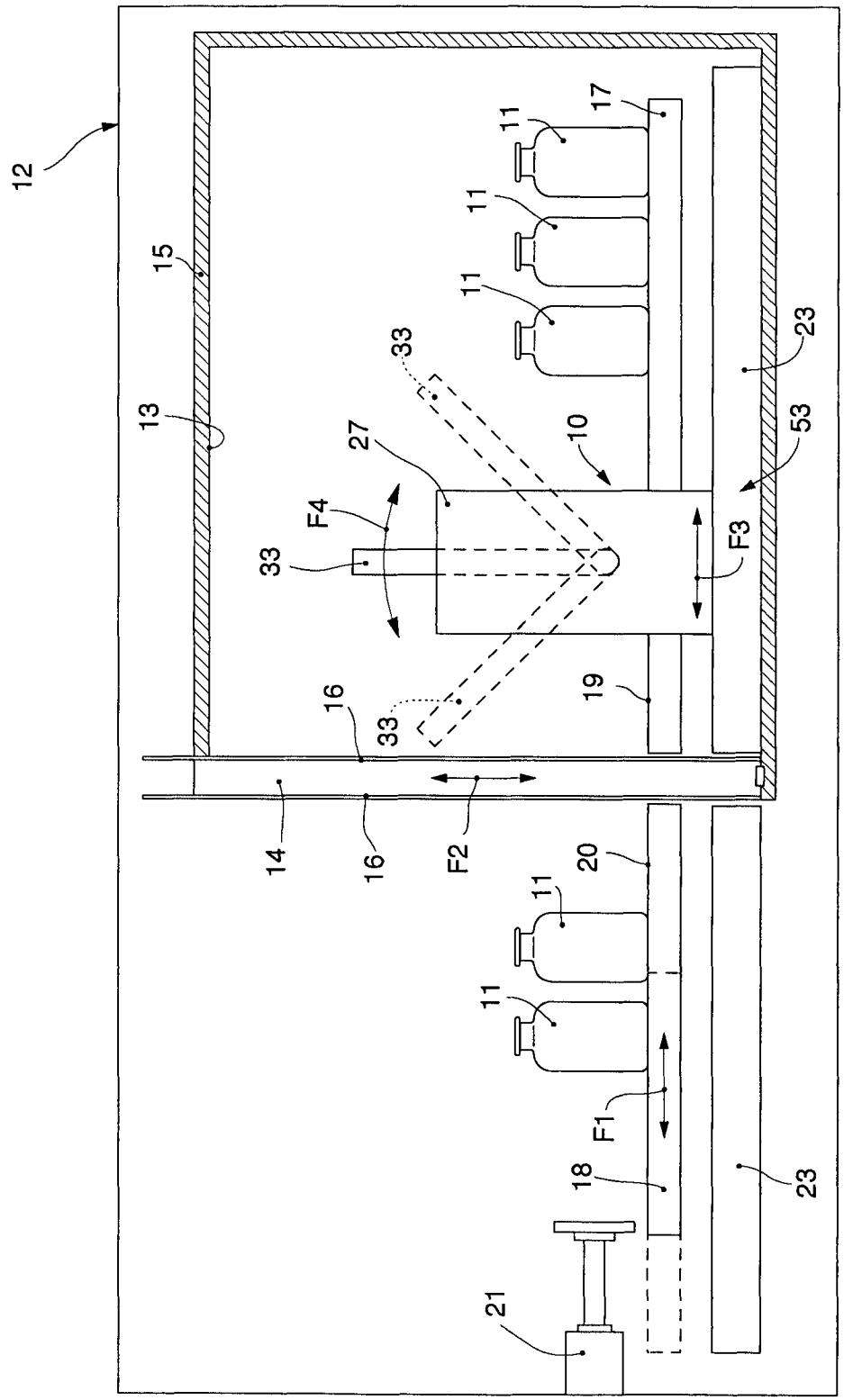
FIG. 1 is a schematic representation of a machine comprising a movement apparatus according to the present invention.

With reference to FIG. 1, a movement apparatus 10 for moving containers 11, in this case containers containing pharmaceutical substances, is associated with a lyophilization machine 12 provided with a lyophilization chamber 13, or processing chamber, used to eliminate the water present in said substances, maintaining the characteristics of the original product. However, it cannot be excluded that the movement apparatus 10 is also associable with a sterilization machine provided with a sterilization chamber.

The lyophilization chamber 13 can be equipped with means to manage the pressure and depression inside it, and possible means to heat it and/or cool it to the desired temperature.

FIG. 1 is only a stylized lateral schematic view of the lyophilization chamber 13 and the movement apparatus 10.

During the lyophilization operation, the lyophilization chamber 13 must be properly sealed. In this case a sealing door 14 is provided, sliding along guides 16 according to arrow F2, to prevent infiltrations of air, dust, impurities or other.

The lyophilization chamber 13 is provided with containing walls 15 and is equipped with at least a loading plane 17, or processing plane, to support the containers 11 to be subjected to lyophilization.

In the case shown here by way of example, a preparation plane 18, outside the lyophilization chamber 13, is mobile linearly, according to arrow F1, in a known manner, and can translate toward and away from the loading plane 17. In this way an upper surface 19 of the loading plane 17 and an upper surface 20 of the preparation plane 18 are aligned. It is therefore possible to transfer the containers 11 from the preparation plane 18 to the loading plane 17 or vice versa.

Furthermore, thruster means 21 have the function of thrusting and positioning the containers 11 along the preparation plane 18.

In this case, the containers 11 are introduced and removed into/from the lyophilization chamber 13 by the same station.

One or more guide means 23, in this specific case comprising one or more guide elements or bars, are attached in cooperation with the loading plane 17 in a loading-unloading position. The guide means 23, for example one per side with respect to the loading plane 17 as can be seen for example in FIG. 2, extend both inside and outside the lyophilization chamber 13 (FIG. 1).

A slider 27, mobile between the inside of the lyophilization chamber 13 and the loading plane 17, is suitable to translate according to arrow F3, in cooperation with the corresponding guide means 23, as can be seen for example in FIG. 2.

As an alternative to the thruster means 21, the mobile slider 27 can be positioned in cooperation with the arrival of the containers 11 and itself provide to move said containers 11.

If the mobile slider 27 itself provides to load and unload the containers 11, the guide means 23 can be put at the side of the preparation plane 18 or above it.

In the same way, the guide means 23 are put at the sides of the loading plane 17, inside the lyophilization chamber 13.

In the case of FIGS. 2, 3, 4, 5 and 6, the slider 27 is connected to a specular slider 27, disposed on the opposite side of the loading plane 17, by means of a collimation bar 29 (FIG. 6), to coordinate the advance of both sliders 27. Instead of the collimation bar 29, electronic means to control the alignment can be provided, such as linear encoders or other.

In the case of FIG. 2, the two sliders 27 support a drawing rod 35 which in this case can also function as a collimation bar 29.

The drawing rod 35 can be solid with the two sliders 27, or can assume, with respect to the two sliders 27, a thrusting-discharge position and a high or raised position (FIG. 3). In the high position, the drawing rod 35 transits between the upper part of the containers 11 and the lower part of another upper loading plane 117 present in the lyophilization chamber 13.

If the drawing rod 35 is solid with the two sliders 27, in order to discharge the containers 11, the loading plane 17 is raised in correspondence with the position defined by the upper loading plane 117, the drawing rod 35 passes to the opposite side, the loading plane 17 is repositioned in the discharge position and discharge is executed.

As will be seen hereafter, the drawing rod 35 can also be moved by means of rotation.

Generally speaking, in the case of a single slider 27 or two sliders 27, whether connected or independent, when they include the drawing rod 35 they are identified as a mobile slider 53 or thruster car.

According to some possible forms of embodiment, the mobile slider 53 has drive means 58 and/or energy supply means 59 suitable to feed the drive means 58, which are provided directly on board the mobile slider 53.

In the case shown for example in FIG. 2, the drive means 58 and/or the energy supply means 59 suitable to feed the drive means 58 can be positioned in the drawing rod 35 and/or in one or both the sliders 27, or on a base bar 123 of the mobile slider 53 (see FIGS. 17-24).

In the case shown in FIG. 4, the slider 27 is a magnetic linear motor that slides along a travel path 12a, or guide means. Similarly, one or more guide means or elements 23 can be provided to hold the magnetic linear motor in position.

According to a variant, the travel path 12a or equivalent guide means, can itself be a magnetic linear motor and the slider 27 can be a mating mean that cooperates with the magnetic linear motor for the controlled displacement thereof.

In other words, the sliding and controlled magnetic field that determines the advance of the slider 27 can be generated by means present on the slider 27, or by means present on the guide means 23.

Instead of having the magnetic linear motor constituting the guide means, or part of them, it is within the spirit of the invention to provide that the guide means carry in them a drive mean that drives a worm screw, or a belt with ridges, which cooperates with mating means present in the mobile slider 53 to move it in a desired and controlled manner.

In the case of FIG. 4, the drawing rod 35 can be fixed or mobile. Furthermore, the slider 27 can have on board both drive means and also control and command means and also, finally, battery means.

In the cases shown by way of example in FIGS. 5 to 11, the following applies.

Figure 6:
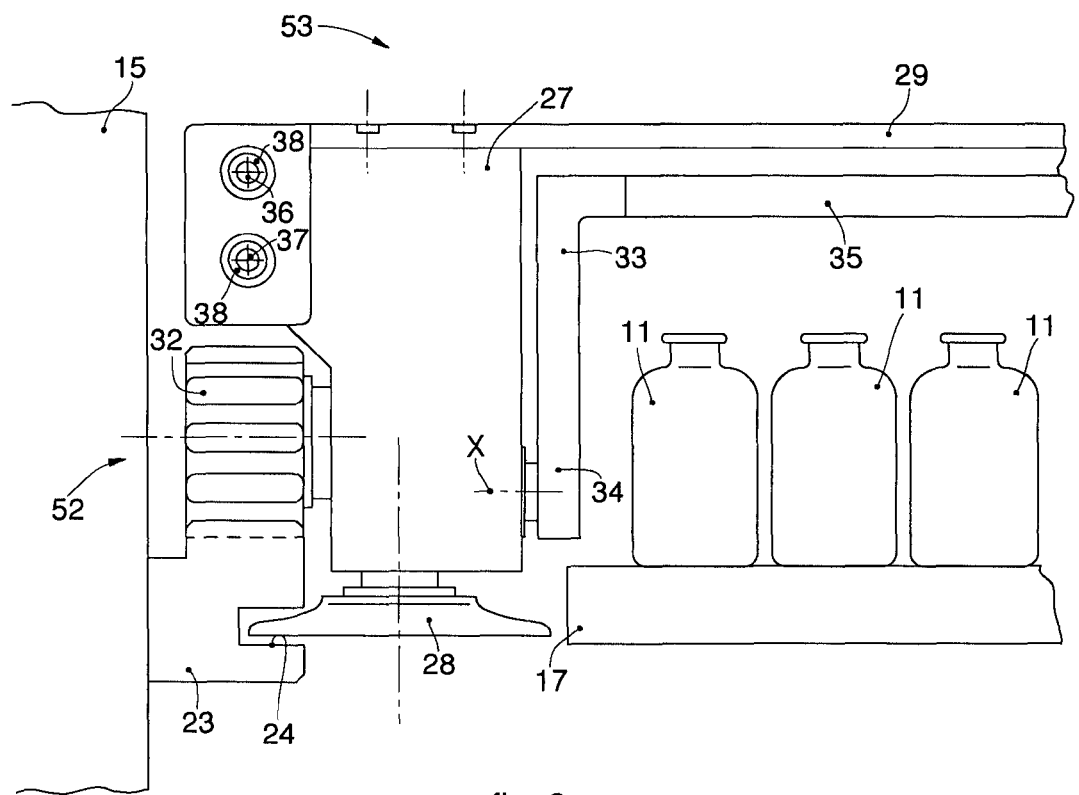
FIG. 6 is a front view of a part of the movement apparatus in FIG. 5.
Figure 8:
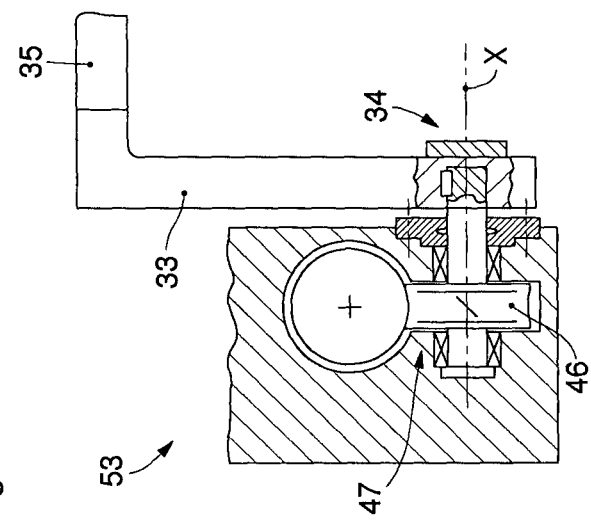
FIGS. 7 and 8 show an example of the transmission of motion of a part of the movement apparatus in FIG. 5.
Figure 7:
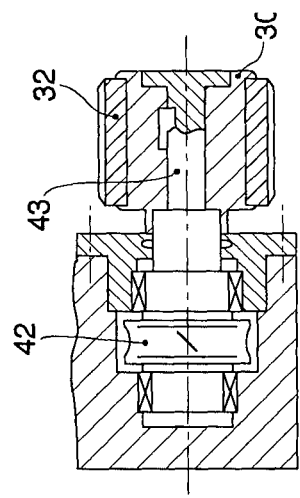
Figure 10:
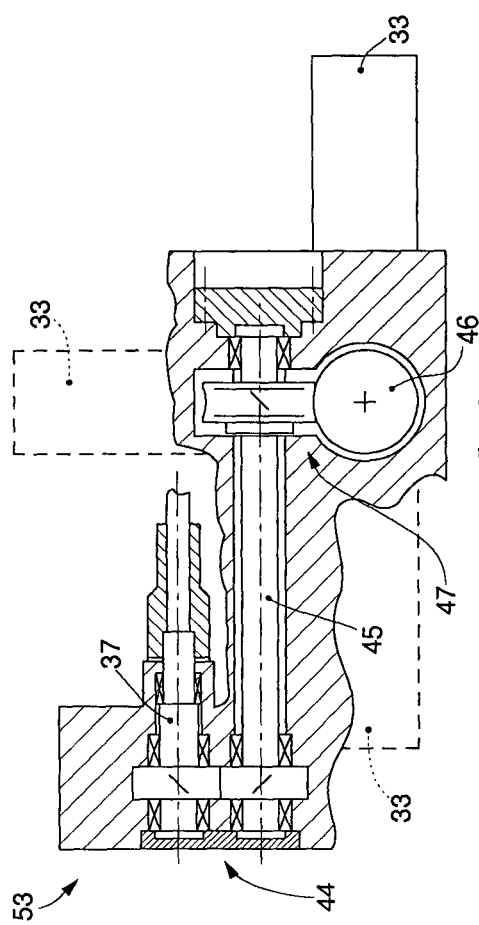
FIGS. 9 and 10 show an example of the transmission of motion of another part of the movement apparatus in FIG. 5.
Figure 9:
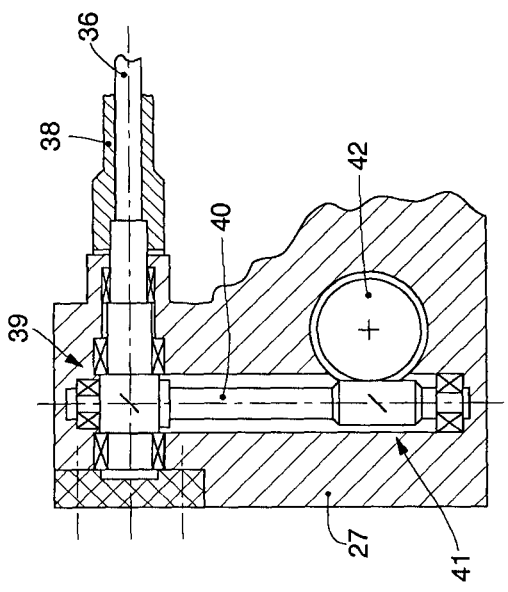

In possible variant forms of embodiment, the guide means 23 are provided with a horizontal rectilinear guide 24 (visible for example in FIG. 6).

According to some variant forms of embodiment, movement means 52 may be provided to move the slider 27, or in general the mobile slider 53, present for example in its lower part, which in this case can be provided with at least a guide roll 28 suitable to move along the rectilinear guide 24.

Figure 5:
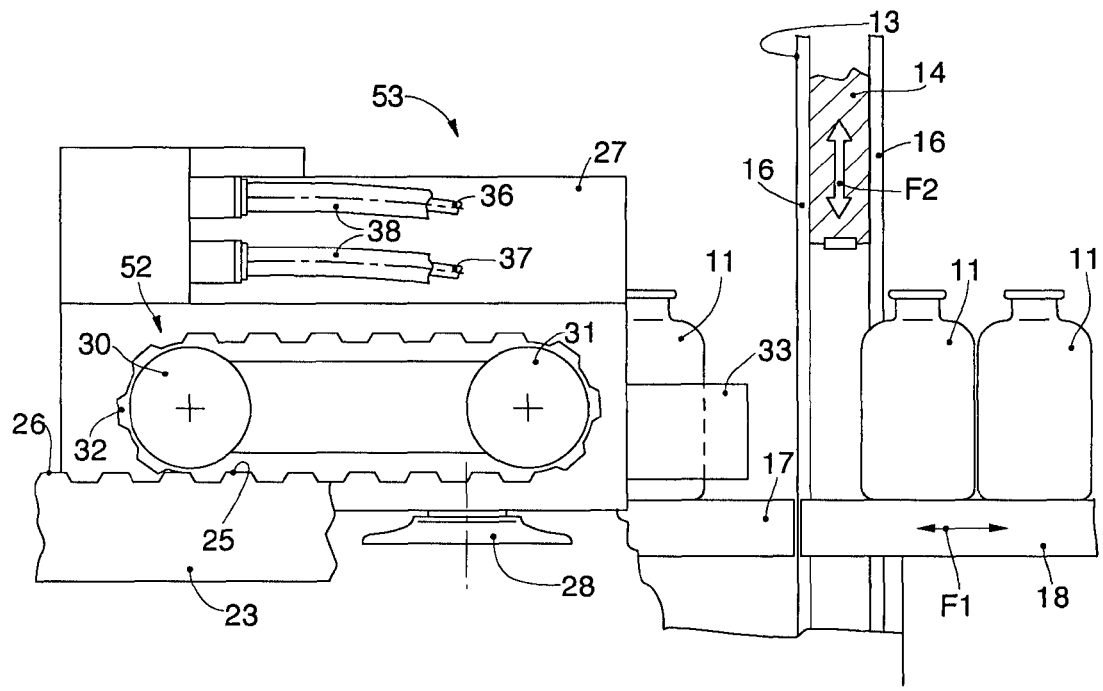
FIG. 5 is a lateral view of a movement apparatus according to the present invention.

In the case shown in FIGS. 5 and 6, there are a plurality of fixed ridges 25 on the guide means 23, advantageously but not necessarily on the upper face 26 thereof.

The slider 27 is associated with a drive wheel 30 and a driven wheel 31, both partly wound and connected with a track 32, the ridges of which have a profile associable with that of the fixed ridges 25.

It is obvious therefore that the slider 27 translates by means of the movement of the track 32 along the plurality of fixed ridges 25.

A positioning arm 33 is associated with the slider 27, on the inner part, and is pivoted to one end 34. In this way, the positioning arm 33 can rotate around an axis X, according to arrow F4 and describing, with the non-pivoted end, an arc of a circumference.

The drawing rod 35 is attached to the positioning arm 33, at the opposite end to that where the slider 27 is pivoted, and has the function of drawing or thrusting the rows of containers 11 disposed on the loading plane 17 and/or on the preparation plane 18.

The drawing rod 35 can assume at least two positions, that is, a position of interference with the containers 11, in which it displaces the containers 11 from the preparation plane 18 to the loading plane 17, and vice versa, and a high position, in which it does not interfere with the containers 11.

The slider 27 and the positioning arm 33 are driven respectively by a first rotary cable 36 and a second rotary cable 37, both wrapped in a sheath 38.

The motion transmission means are supplied only by way of example. If rotary cables are used, they may be replaced by mechanical motors that receive the energy for example from loadable elastic means, such as springs.

The first rotary cable 36 transmits the rotational motion to a first return unit 39 (FIGS. 7 and 8), to transmit motion to a first return shaft 40. A first motion transmission unit 41 transmits the motion, engaging with a first drive wheel 42. The first drive wheel 42 is coaxial and directly connected, by means of a first rotation shaft 43, to the drive wheel 30 on which the track 32 is mounted. In this way, the rotation of the first rotary cable 36 transmits rotation to the drive wheel 30 and allows to translate the slider 27 along the guide means 23.

The second rotary cable 37 (FIGS. 9 and 10) transmits motion to a second return unit 44. By means of a second return shaft 45, the rotation is transmitted by means of a second transmission unit 47 to a second drive wheel 46, with an axis of rotation that is the same as that around which the end 34 of the positioning arm 33 rotates. In this way, the rotation of the second rotary cable 37 allows the end 34 of the positioning arm 33 to rotate around the axis X.

Figure 11A:
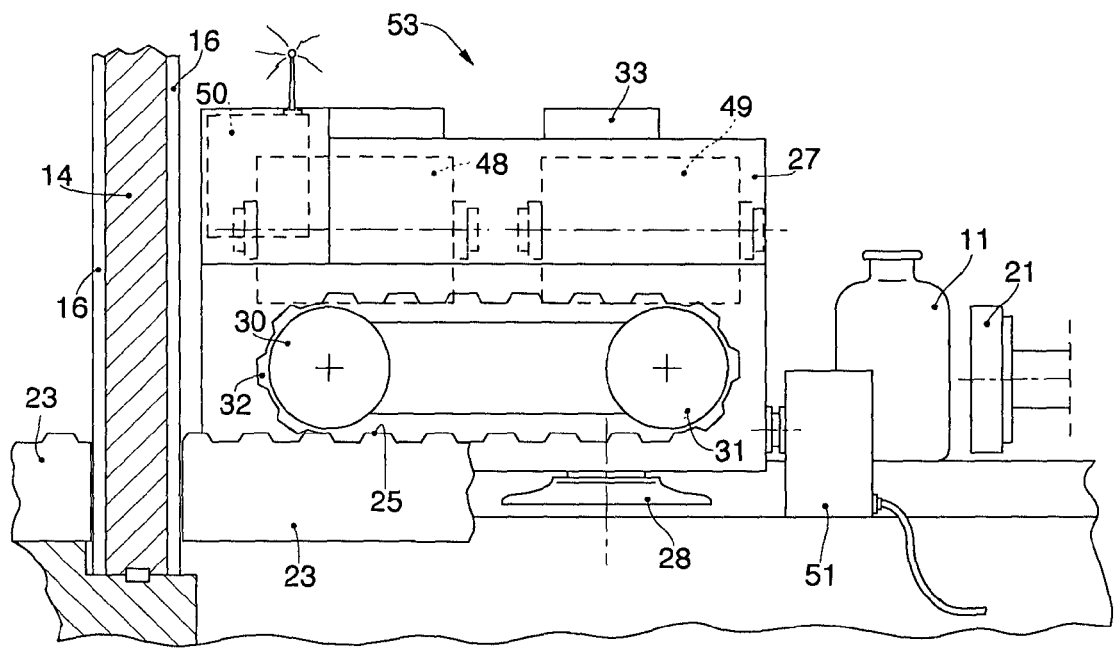
FIG. 11a is a variant of FIG. 5.

FIG. 11a shows a variant in which the mobile slider 53 is provided with a first electric motor 48 to drive the drive wheel 30 and a second electric motor 49 to drive the positioning arm 33. The mobile slider 53 is provided with independent batteries, not shown, and a control and command unit 50

Instead of two electric motors, or in the mechanical variant of two mechanical motors or only one mechanical motor, a single electric motor can be provided that cooperates with selector means to drive the motion and/or rotation.

Instead of the internal energy sources, another variant provides to feed the energy by means of an electric cable or mechanical cable.

In FIG. 11a, which shows the lyophilization chamber 13 closed and in the working configuration, the mobile slider 53 can be seen in a stand-by position outside the lyophilization chamber 13 to act on the containers 11 present in the lyophilization chamber 13, so as to unload all the loading planes 17. In this case there are energy supply means, for example batteries, on board the slider 27. Furthermore, the mobile slider 53 can be connected to recharging means 51, for example for the batteries or accumulators, described in detail hereafter.

The spirit of the invention includes a design embodiment that is characteristic on each occasion of the designing body.

Figure 11B:
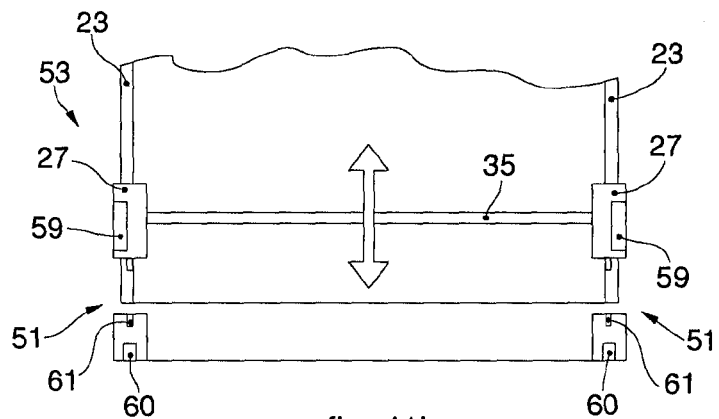
FIGS. 11b and 11c are schematic representations of a variant form of embodiment of the movement apparatus of the present invention.
Figure 11C:
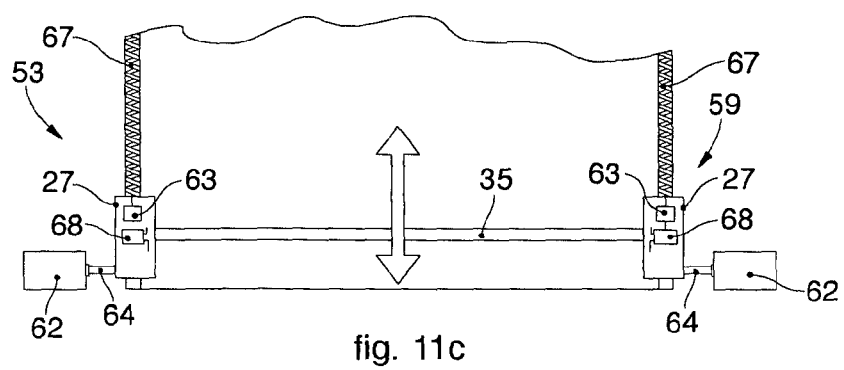

FIGS. 11b and 11c are used to describe variant forms of embodiment in which recharging means 51 of the energy supply means 59 are provided to be used when the movement apparatus is, for example, stopped, that is, when the lyophilization step is in progress, but without limiting the recharging possibility only to said step when the movement apparatus is stopped. If the energy supply means 59 comprise electric batteries or accumulators, they can be recharged by coupling with primary electric energy supply means 61 (FIG. 11b), such as electric connectors connected for example to an electric distribution network, or by wireless recharging means based on the induction effect, based for example on the transformer principle, or again by wireless recharging means based on the conversion of radio waves to specific frequencies into electric energy. Overload control means 60 can possibly be provided.

In possible variant embodiments, the energy supply means 59 can be essentially mechanical and include elastic means able to accumulate and elastically release kinetic energy, in a controlled and continuous manner, to determine the movement of the mobile slider 53, or one or more of its components, along the guide means 23.

For example, in a variant, described with reference to FIG. 11c, the elastic means can include an elastic member 67 associated with each of the sliders 27, configured to extend along a drive travel consistent with the development of the guide means 23.

In this variant, a motion distributor mean 68 may be provided, associated with the drive means 58, so as to selectively determine the advance or retreat of the mobile slider 53. For example, the motion distributor mean 68 can be configured to exploit the expansion of the elastic member 67 in the drive travel in order to complete both the outward and return travel of the mobile slider 53. Furthermore, a regularizer mean 63 may be provided, configured to regularize the travel of the elastic member 67, such as for example an escapement system.

If the energy supply means 59 are mechanical, controlled mechanical recharging means 62 are provided. In the case of controlled mechanical recharging means 62, they can be equipped at least with temporary coupling means 64 and overload control means 66.

In some variant forms of embodiment, the elastic means can comprise elastic spring means (as for example in FIG. 11c). The term spring may be understood as a traditional mechanical spring, or also a mechanical member susceptible to non-permanent elastic deformation following a mainly bending stress. Or, in other variants, the elastic means can include elastic leaf spring means or also piston-type movement apparatuses driven fluid-dynamically, for example gas pistons, hydraulic pistons, oil-dynamic pistons.

FIGS. 12-16 are used to describe forms of embodiment of a movement apparatus to move containers 11 containing substances, comprising transit paths 55, 69 developing at least along an axis of movement to serve several machines, operating stations or user devices. The machines or user devices can be machines for processing the substances in the containers, for example lyophilization and/or sterilization machines, and also machines to fill containers 11 with the substances or to perform other operations on the containers or substances contained in the containers 11 and/or also packaging machines, canning machines or bagging machines of the containers 11.

The movement apparatus comprises at least a movement, transport and at least temporary storage plane 54, hereafter transport plane 54, for the containers 11, which is provided with autonomous slider-type movement means 65 to move the transport plane 54 along the transit paths 55, 69, and with energy supply means, for example of the type described above in connection with the examples in FIGS. 1-11, to feed the slider-type movement means 65.

In particular, the transport plane 54 can be configured to cooperate at least temporally with a mobile slider 53 to move the containers 11 from and toward said machines or user devices.

Figure 12:
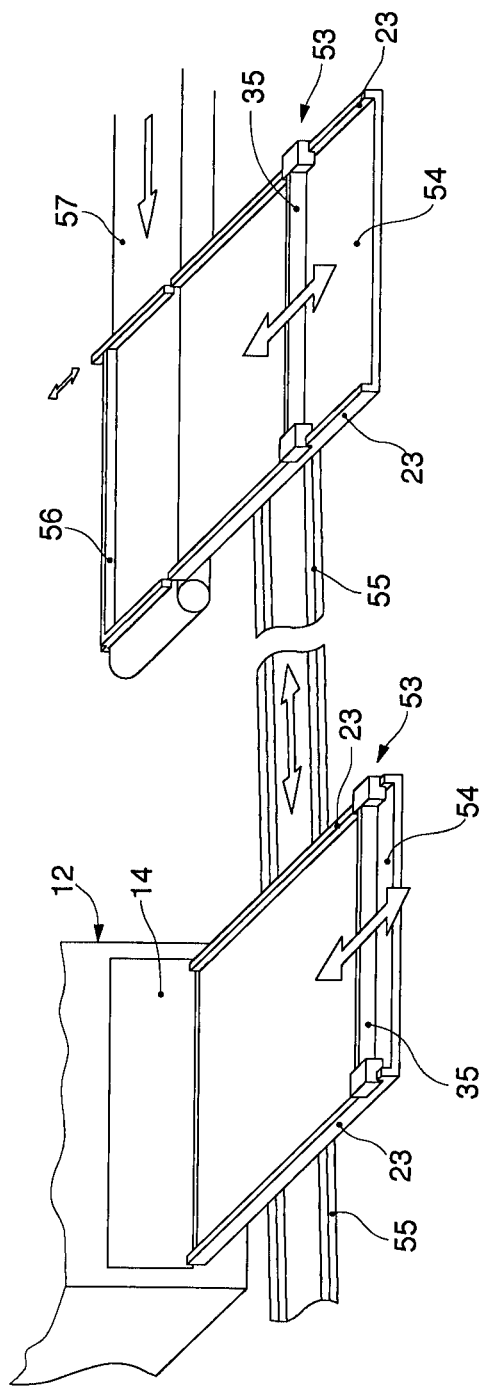
FIG. 12 shows another application of the mobile slider in relation to a transport plane.

For example, in FIG. 12 another and new use of the mobile slider 53 is schematized, in possible association with the transport plane 54. The transport plane 54 can include the preparation plane 18 and movement systems along one axis only, or along two transverse axes, for example orthogonal, which can include slider-type movement means 65, which can comprise linear motors as described here, and transit paths 55, 69.

According to this solution, the transport plane 54 may or may not include the guide means or elements 23, fixed, or suitable to generate the desired and controlled movement in the mobile slider 53.

Furthermore, the transport plane 54 can have its sizes coordinated with the loading plane 17.

In the case shown by way of example in FIG. 12, a situation is shown in which the guide means 23 are fixed and the mobile sliders 53 are autonomous since they contain the energy sources in their structure.

Furthermore, according to the present invention, the transport plane 54 can have both its own energy source or energy supply means, which feeds the drive, electric, magnetic or mechanical means located on board the transport plane 54 to drive the slider-type movement means 65, and also control and command means suitable to dialog with a control and command system.

In the case of transport planes 54 that have guide means 23 both fixed and equipped with movement means of the mobile slider 53, the movement, transport and at least temporary storage system of the containers 11 is more elastic, simplified and versatile.

Furthermore, the transport plane 54, in the down times, can cooperate with an energy source to recharge its own energy supply means.

According to a variant application, in the down times the mobile slider 53 can operate on several lyophilization machines 12, or other machines or work places, depending on the working times that the machines can have. In this case, the mobile slider 53, equipped with its own movement means, for example slider-type movement means 65 of the type described above, can cooperate with the specific transit paths 55, 69, or second guide means, that allow them to move autonomously from one lyophilization machine 12 to another, recognizing it.

These movements are subject to the instructions that a control and command system transmits according to the situation or position of the transport plane 54.

According to another variant, the transport plane 54 can operate with one or more lyophilization machines 12, or also with other work stations or operating units.

The transport plane 54 can cooperate directly with the sealing door 14, instead of a traditional loading and unloading station, or in association with the traditional loading and unloading station.

All the containers 11 on the loading plane 17, or some of them, or again the containers of several loading planes 17, can find a place on the transport plane 54.

The transport plane 54, in the case shown here, has the guide means 23 mating with the mobile slider 53 and cooperates with the transit paths 55, 69 or second guide means.

The guide means 23 cooperate with the guide means 23 inside the lyophilization chamber 13 and present, where necessary, in cooperation with operating stations or units.

Therefore, the mobile slider 53 can be transferred to a desired position, using the transport plane 54, and/or to a work station, in cooperation with an operating unit, in coordination with the containers 11 and with respect to the containers 11.

The transport plane 54, with known means, that is, with the slider-type movement means according to the present invention, and on transit paths for example indicated by the reference number 55 in FIG. 12, can therefore be moved as desired to the operating positions upstream or downstream of the lyophilization machine 12 and with the lyophilization machine.

In the position to which it is translated, the transport plane 54 performs the operations intended for it, for example the total or partial loading or unloading or filling, sealing, control, verification etc. of the containers 11, or other operations even by means of the mobile slider 53 if kept present there.

In the case of FIG. 12, the movement apparatus comprises a feed and/or discharge conveyor belt 57 configured to cooperate at least temporally with the transport plane 54. For example, the conveyor belt 57 may have limiter means 56 to limit the loading and/or unloading of the containers 11, by means of the mobile slider 53 onto and from the transport plane 54.

According to the invention, the mobile slider 53 may have dialog and recognition means with the transport plane 54. Similarly, the transport plane 54 can have dialog and recognition means with the stations that it cooperates or could cooperate with.

Figure 13:
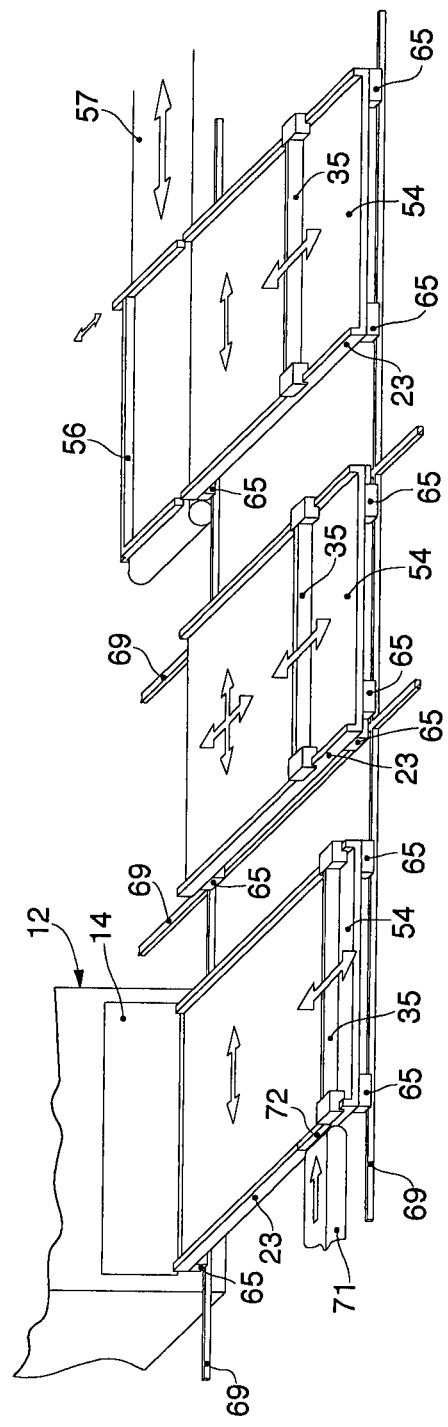
FIG. 13 shows other forms of embodiment of the mobile slider in relation to a transport plane.

FIG. 13 is used to describe variant forms of embodiment evolved with respect to what was described with reference to FIG. 12, in which the transport plane 54 can have movement systems along two orthogonal axes. For example, the transport plane 54 can be moved into different operating positions, by means of suitable transit paths 69 and slider-type movement devices 65, to cooperate with different lyophilization machines 12 disposed according to a desired geometry, for example parallel or in lines, and to possibly cooperate with other operating units, for example filling or packaging stations or other.

If the transport plane 54 has to move along travel paths 12*a* that define displacement lines with two transverse axes, for example orthogonal, the movement systems include slider-type movement means 65 that on each occasion are configured to selectively couple with the transit paths 69 on which they have to move, compatibly with the geometric development thereof.

In some variant forms of embodiment, the slider-type movement means 65 can be configured retractable with respect to the lower surface of the transport plane 54, to selectively couple with a corresponding transit path 69 as a function of the direction of movement to be followed, as shown schematically for example in FIG. 14. For example, the slider-type movement means 65 can include pairs of movement sliders 65 disposed with their operating directrixes angled or intersecting with respect to each other, or transverse, for example orthogonal, consistent with the angled or intersecting geometric development of the transit paths 69. For example, the slider-type movement means 65 can be located in correspondence with the tops of the lower surface of the transport plane 54, as shown for example in FIG. 14 in relation to one of the tops of the transport plane 54. Control and command means can manage the whole.

FIG. 13 shows, for each direction of movement of the transport plane 54, pairs of lateral transit paths 69 that cooperate with the slider-type movement means 65 provided below, near the sides of the transport plane 54. The transit paths 69, or second guide means, can develop in a transverse direction, such as for example perpendicular, to the direction of insertion of the containers 11 into the lyophilization chamber 13, and also in directions parallel thereto, for example to serve other lyophilization machines 12 or other operating units. In particular, as can be seen in FIG. 13, the pairs of lateral transit paths 69 can be transverse, for example orthogonal, with respect to each other, or they can intersect.

In this variant form of embodiment, a device 71 may be provided for loading the containers 11, for example with a belt or analogous movement mean, to load the containers 11 onto the transport plane 54, in a loading direction for example transverse to the direction of feed of the containers 11 into the lyophilization chamber 13 or with respect to other machines or user devices. To be able to accept the containers 11 from the loading device 71, the transport plane 54 can be provided with openable delimitation means 72, for example constituting a portion of the guide means 23, disposed aligned to the direction of feed defined by the loading device 71.

In some variant forms of embodiment, such as for example as schematized in FIGS. 15a and 15b, the transport plane 54 can be at least partly divided into two, that is, it can have an upper part 54a, for example that can function as a preparation plane 18, positionable angularly, by means of rotation by a rotation device 73 (FIG. 15a), or linearly, by means of at least partial translation (FIG. 15b) with respect to a base or lower component 54b, which allows the transport plane 54 to move along the transit paths 69. For example, in the variant shown in FIG. 15b it is possible to provide that the preparation plane 18 slides linearly on guides 77 positioned on the base or lower component 54b.

FIG. 16 is used to describe a variant form of embodiment, as an alternative to what was described with reference to FIG. 13, in which a single central transit path 69 is provided, to move each of the transport planes 54 in a determinate direction of movement. It is understood that the central transit paths 69 of the transport planes 54 can be transverse with respect to each other, for example orthogonal, as described with reference to FIG. 13, and that the slider-type movement means 65 can be configured consistently, positioned in a central position on the lower surface of the transport plane 54. In particular, the slider-type movement means 65 of a determinate transport plane 54 and provided to cooperate with two central transit paths 69 that intersect are in turn positioned in a configuration with the respective operating directrixes reciprocally angled, or intersecting.

In this variant, in order to balance and stabilize the motion of each transport plane 54 along the single central transit path 69, preventing unwanted oscillations around the latter, pairs of support bars 75 are provided, cooperating in sliding support with the sides of each transport plane 54 opposite the corresponding central transit path 69.

Figure 17:
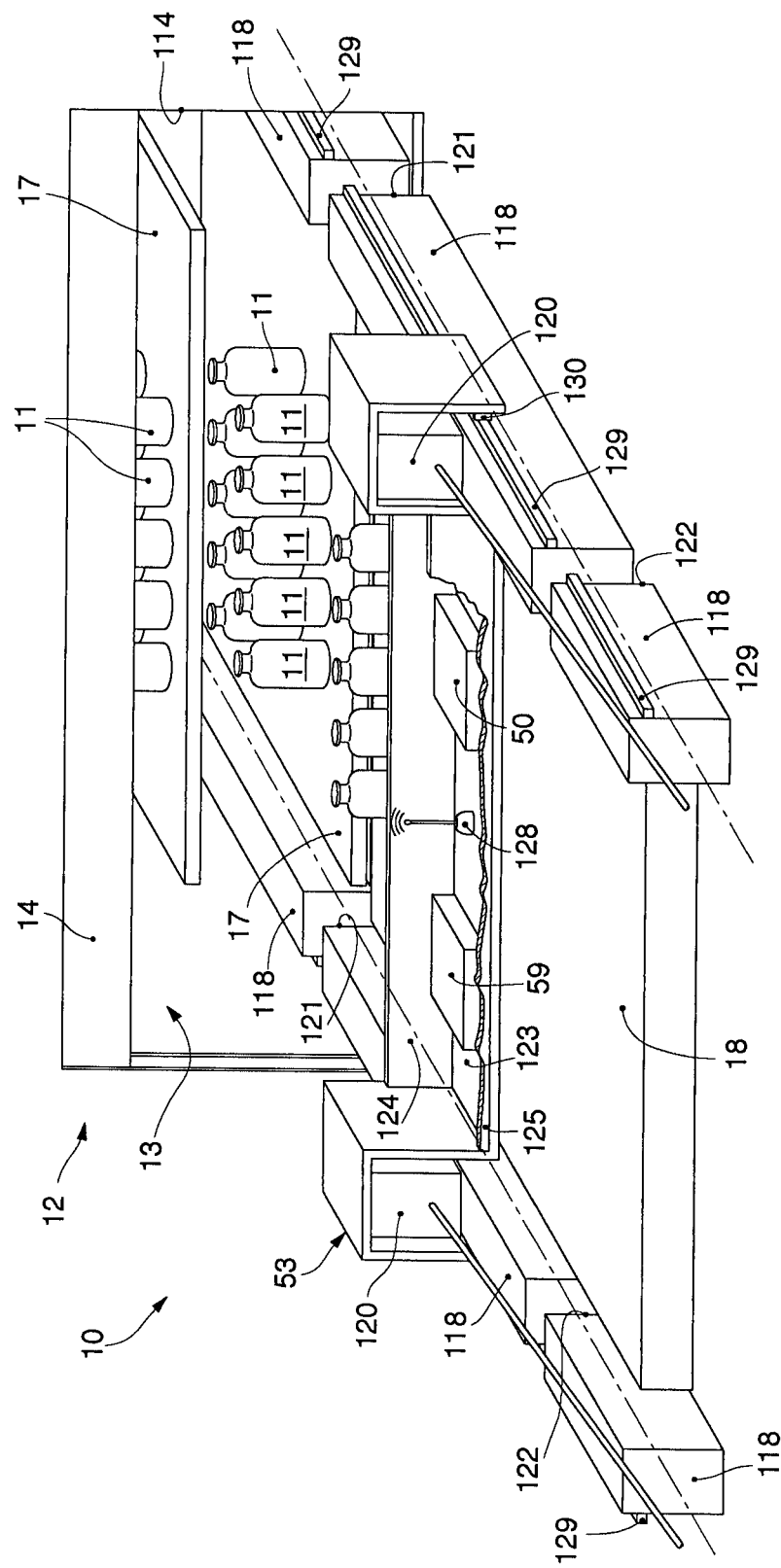
FIG. 17 is a schematic and three-dimensional view of one form of embodiment of a movement apparatus according to the invention.
Figure 18:
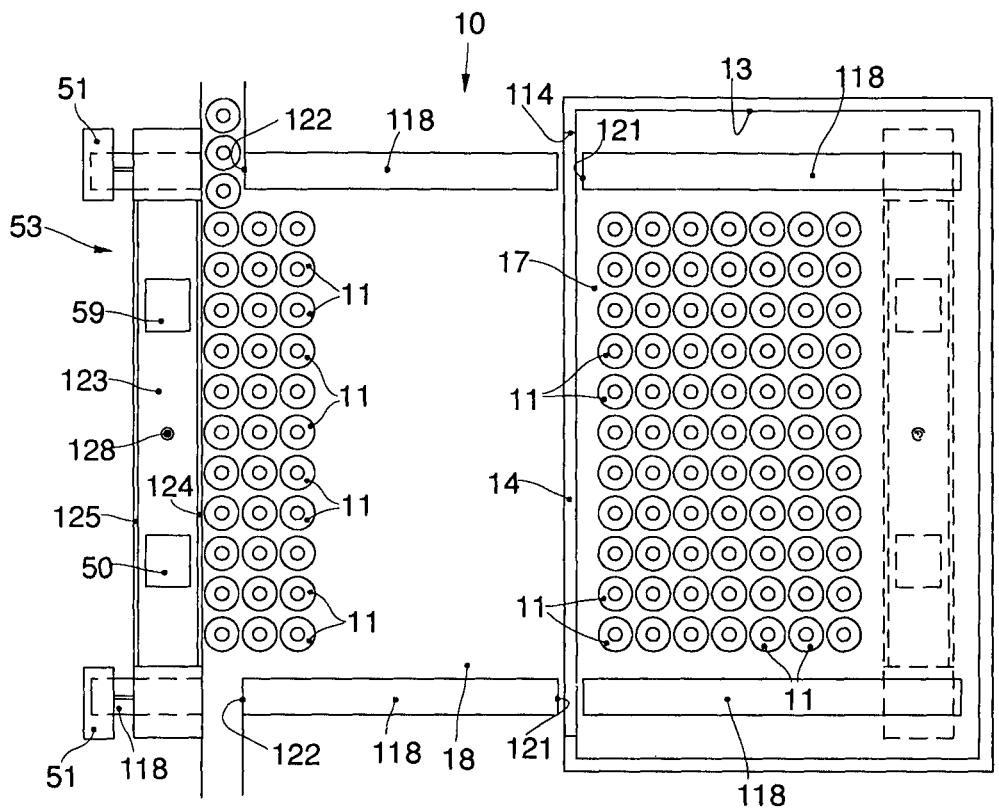
FIG. 18 is a schematic plan view of the apparatus in FIG. 17.
Figure 19:
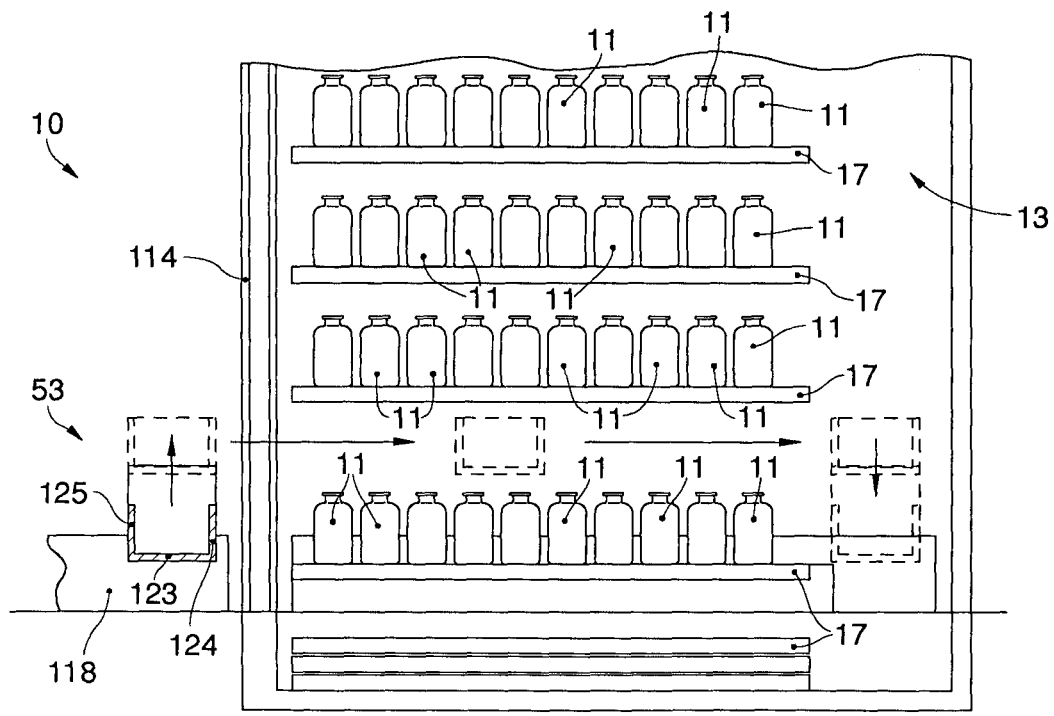
FIG. 19 is a schematic lateral view of the apparatus in FIG. 17.

FIGS. 17 to 19 are used to describe schematically other variant forms of embodiment of an apparatus 10 according to the invention.

The drawings show a preparation plane 18 on which containers 11 or bottles arrive and are disposed to be forwarded to a lyophilization or processing chamber 13, from which they are then removed, returned to the preparation plane 18 and finally distanced.

In a known manner, the containers 11 are thrust, through a loading door 114, to the lyophilization chamber 13 of a lyophilization machine 12.

A sealing door 14 is provided to seal the loading door 114 from outside.

The containers 11 are positioned in the lyophilization chamber 13 in a known manner on a loading plane 17 or processing plane.

In the solution shown in FIG. 17, three pairs of transfer and guide linear motors 118 are provided, in pairs to control both ends of a mobile slider 53 or thruster car. Two paired sliding linear motors 120 are present on the mobile slider 53.

In the case shown in FIG. 17, the three pairs of transfer and guide linear motors 118 have intermediate spaces respectively indicated by the reference numbers 121 and 122.

The intermediate space 121 serves to allow the sealing door 14 to close the loading door 114, sealing it, while the intermediate space 122 serves to allow the containers 11 to enter onto the preparation plane 18 and to discharge the same from the preparation plane 18.

According to a variant, the intermediate space 122 is not present and the two pairs of transfer and guide linear motors 118 that would cause it are only one pair.

For the entry and exit of the containers 11 to/from the preparation plane 18, either the transfer and guide linear motors 118 are kept low, or they are equipped with a low position of non-interference and a high position.

The length of the sliding linear motors 120 is such that they can overcome the intermediate spaces 121 or 122 without losing their continuous motion.

According to a variant, means extending before and/or behind the sliding linear motors 120, for example blocks, tracks or wheels, are present to support each sliding linear motor 120 when at least part of it is in the intermediate space 121 or 122.

The systems and devices to keep a transfer and guide linear motor 118 reciprocally aligned with a sliding linear motor 120 so as to create a normal linear motor, are of a known type and are understood to be included here.

It comes within the spirit of the invention, when it is necessary for positioning the containers 11 inside the lyophilization chamber 13, to provide that the mobile slider 53, either wholly or partly, can traverse with respect to the longitudinal axis of the lyophilization chamber 13 or the preparation plane 18.

In the attached drawings, which schematically show variant forms of embodiment, the two components of the linear motor are shown schematically one (120) above the other (118). In practice it is known that the two components can also be adjacent to each other, or the one which in the drawings is shown below (118) can be above the other (120), and vice versa.

Additionally, the drawings show traditional linear motors, but it also comes within the spirit of the invention to use linear motors in which the transfer and guide linear motor 118 is cylindrical and the sliding linear motor 120 slides in relation to it, with a complete or partial toric form.

In the case shown in FIG. 17, the mobile slider 53 has a bearing structure consisting at least of a base, or base bar 123, and two thruster walls respectively front 124, which serves to introduce the containers 11 into the lyophilization chamber 13, and rear 125, which serves to remove the containers 11. The base 123, with the front 124 and rear 125 walls, can be fixed or at least partly positionable vertically. For example the base or base bar 123 can be configured to assume at least two positions, a first working position in which it cooperates with the containers 11, and a raised position in which it does not interfere with the containers 11.

For example a control and command unit 50, possible energy supply means 59, for example batteries, and wireless communication means 128, such as for example infrared, radio waves according to one or another of the known protocols (Wi-fi, Bluetooth, Zig-bee, etc.) or laser ray means, are all found on the base 123.

The base 123, with the front 124 and rear 125 thrust walls, and also what is found on the base 123 as described above, can assume a lower thrusting position and a higher, passing over position (FIG. 19).

According to a variant, it is possible to provide that, when the mobile slider 53 has to be positioned in the rear part of the containers 11 to thrust them out of the lyophilization chamber 13, it is the loading plane 17 that is raised, so that the mobile slider 53 can pass under it.

According to a work formulation, the transfer and guide linear motors 118 are the active components, and therefore drivable to supply the desired motion to the sliding linear motor 120.

A remote control and command unit, not shown, governs the whole.

In said work formulation, linear encoders 129, which can be absolute or relative, associated with the transfer and guide linear motors 118, cooperate with a detector 130 on board the mobile slider 53.

If the linear encoders 129 are present on all the pairs of transfer and guide linear motors 118, it is possible to control the perfect parallelism or correct misalignment of the mobile slider 53.

Through the linear encoders 129 the position of the two lateral components of the mobile slider 53 is transmitted to the control and command unit which, acting on the linear motors, positions the mobile slider 53 in the desired condition of alignment.

It comes within the spirit of the invention to provide that instead of the linear encoder 129 a guide is provided, for example with teeth, on which a wheel engages that makes a rotary encoder rotate.

According to another formulation, the transfer and guide linear motors 118 are passive and it is the sliding linear motors 120 that can be driven to determine the desired displacement in the desired terms. This other formulation allows other variants.

One variant provides that the sliding linear motors 120 are fed by means of a retractable electric cable that can also carry the commands and/or conductors of instructions and information.

According to a different formulation of this variant, instead of the electric cable a retractable rotary cable is provided, motorized at one end, which with the opposite end drives a mechanical motor located on board the mobile slider 53.

Another variant provides that the energy supply means 59 on board the mobile slider 53 are suitable to feed the sliding linear motors 120: in this case, recharging means 51 (FIG. 18), for example at end-of-travel, can be provided.

Figure 20:
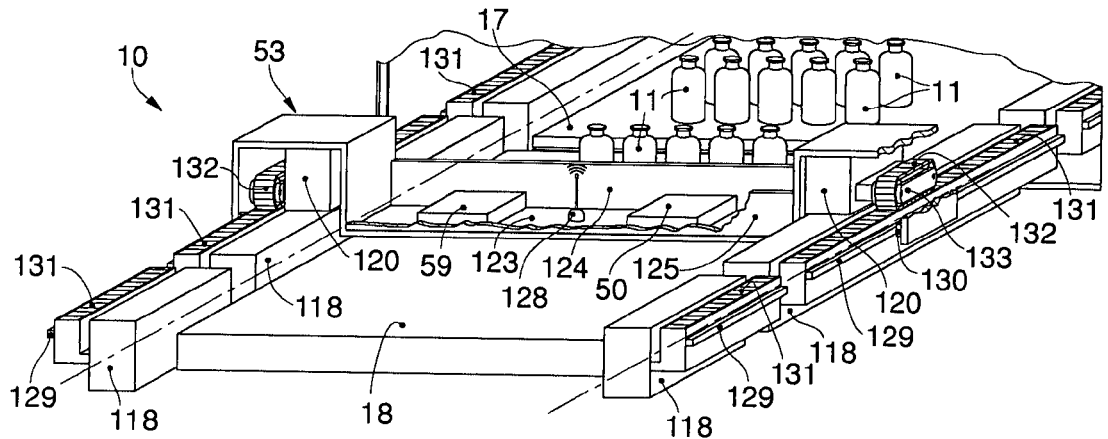
FIGS. 20 to 26 show variant solutions of the apparatus in FIG. 17.

With reference to the formulation shown in FIG. 20, which is another variant of those indicated above, and in which the linear or rotary encoder 129 can be present, at the side of the transfer and guide linear motors 118 there is a rack 131 that cooperates with a closed-ring toothed belt 132 associated with the mobile slider 53 so as to mechanically condition the parallelism of the sides of the latter.

The toothed belt can be idle.

A variant of this solution provides that the closed-ring toothed belt 132 also has an internal toothing that cooperates with one or more toothed wheels 133, rotating and associated with the mobile slider 53.

Figure 21:
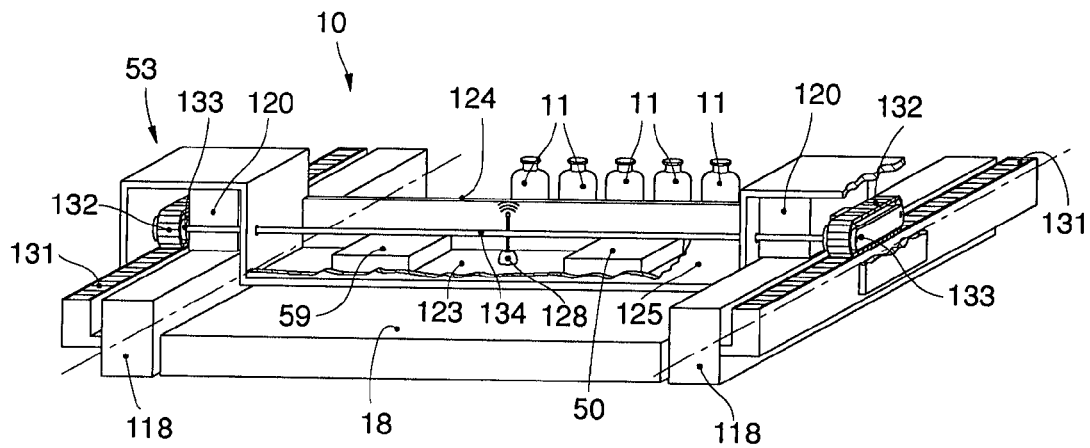

FIG. 21 shows another variant in which toothed wheels 133, or wheels that carry the closed-ring toothed belt 132 of one and the other part of the mobile slider 53, are made axially solid by a shaft 134, so as to guarantee the parallelism with mechanical means.

Figure 22:
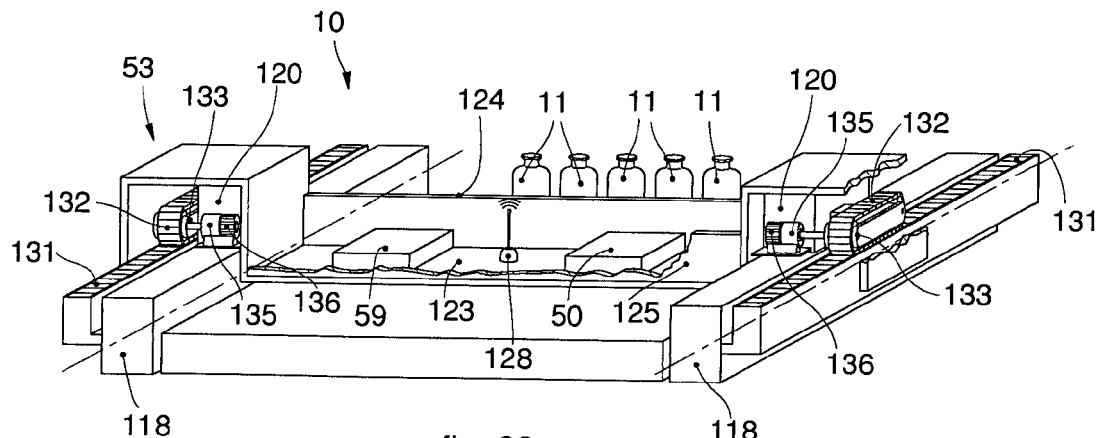

The variant in FIG. 22 provides that rotary electric motors 135, which include encoders 136, are associated with the toothed wheels 133. This variant has two peculiar characteristics: the first is the presence of the encoders 136, which provide information to the control and command unit 50 which allows the control and command unit or the remote control and command unit to correct the position of the two sides of the mobile slider 53. The second characteristic allows to prevent there being a transfer and guide linear motor 118 inside the lyophilization chamber 13. In fact, the presence of the rotary electric motors 135 means that in the lyophilization chamber 13 the mobile slider 53 slides on linear guides without magnets, whether fixed or electrically activated.

Figure 23:
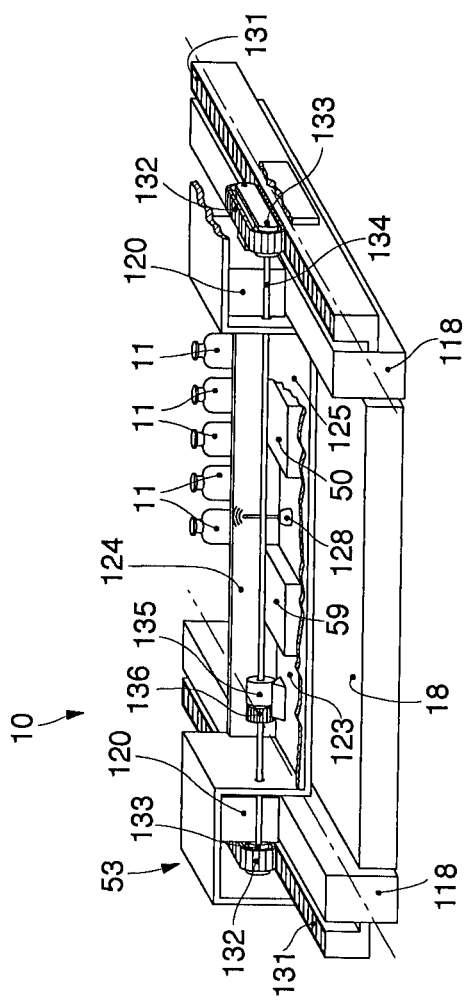

The variant in FIG. 23 is similar to the one in FIG. 22, with the difference that instead of two rotary electric motors 135, phase controlled by an electronic system, there is only one rotary electric motor 135, with the corresponding encoder 136, which by means of the shaft 134 receives and/or supplies motion to the toothed wheels 133 present at the two ends of the mobile slider 53.

Figure 24:
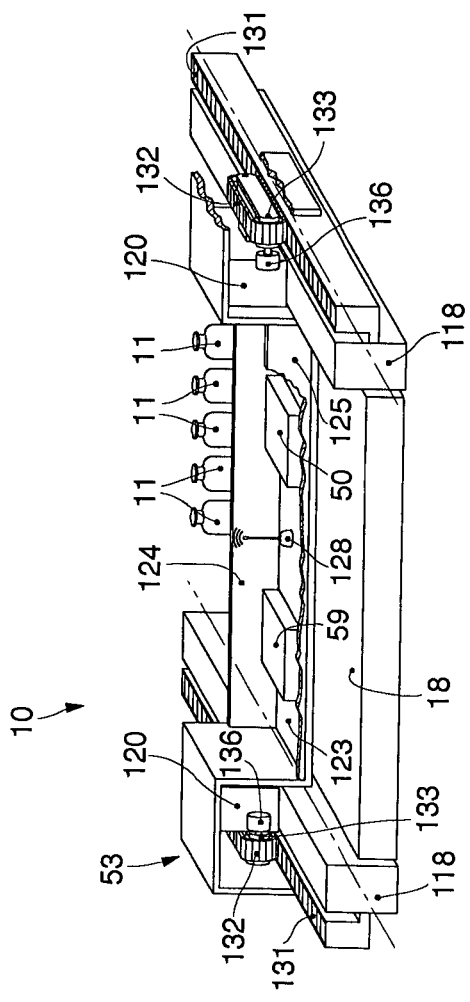

The variant in FIG. 24 provides that there is a rotary encoder 136 associated with the toothed wheels 133.

Figure 25:
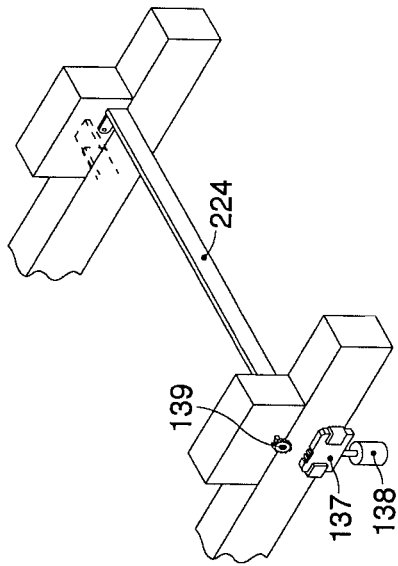

With reference to the variant solution shown in FIG. 25, the mobile slider 53 consists only of the sliding linear motors 120 that can carry, in the above or lateral container, the control and command unit 50, the energy supply means 59 and the communication means 128. In the variant solution shown in FIG. 25, the parallelism between the two components of the mobile slider 53 is maintained with one or the other of the systems, mechanical or electronic, previously described. The movement can be generated by the transfer and guide linear motors 118, or the sliding linear motors 120 themselves, or for one segment by the sliding linear motors 120 and for another segment by rotary electric motors 35 or mechanical motors.

Compared with the previous variants, the solution in FIG. 25 is characterized by the presence of a mobile thruster bar 224, able to assume a first low position for thrusting the containers 11 toward the lyophilization chamber 13, a second high position of non-interference with the containers 11 and a third low position to thrust the containers 11 outside the lyophilization chamber 13, toward the preparation plane 18.

As we said before, in this case too, instead of raising part of the mobile slider 53 it is possible to raise the loading plane 17 from which the containers 11 are to be removed, to make the mobile slider 53 pass under it and them again lower the loading plane 17.

The thruster bar 224 can be driven by one or more temporary drive tracks 137, fixed or mobile. Each temporary drive track 137 can be toothed and driven vertically by a jack, for example electric 138, possibly driven by batteries or by a mechanical mean that, acting on a wheel 139, which can be toothed, positions the thruster bar 224. The presence of analogous systems on both the sliding linear motors 120 supplies a balanced drive and positioning to the thruster bar 224.

Means are provided to hold the thruster bar 224 in the position desired on each occasion.

Figure 26:
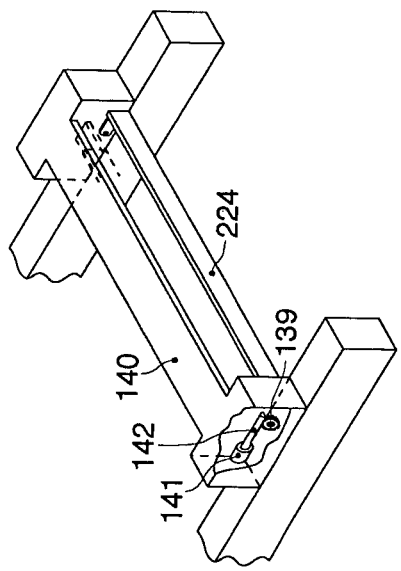

The solution in FIG. 26, compared with that in FIG. 25, has a connection bar 140, located in a high position, which makes the mobile slider 53 rigid and in which the various auxiliary components can be accommodated.

Instead of the mechanical system, for example the type shown in FIG. 25, the thruster bar 224 can be driven by a rotary electric motor, a linear motor 141 or an electric jack located on board the mobile slider 53. In the case of the linear motor 141, for example it can axially drive a rack 142 which acts on the toothed wheel 139.

It is clear that modifications and/or additions of parts may be made to the movement apparatus 10 as described heretofore, without departing from the field and scope of the present invention.

It is also clear that, although the present invention has been described with reference to a specific example, a person of skill in the art shall certainly be able to achieve many other equivalent forms of movement apparatus, having the characteristics as set forth in the claims and hence all coming within the field of protection defined thereby.

The invention claimed is:

1. A movement apparatus for a lyophilization and/or a sterilization machine to move containers containing substances, the apparatus comprising:
    transit paths including one or more guides and developing at least along an axis of movement to serve several machines or user devices, the axis of movement being substantially horizontal; and
    a transport plane for the containers, the transport plane including one or more guides equipped with one or more sliders, the one or more sliders configured to move the transport plane along the transit paths, and the one or more sliders including one or more magnetic linear motors having a battery or electric energy accumulator to power the one or more magnetic linear motors, the battery or electric energy accumulator being disposed on-board the one or more sliders,
    wherein the transit paths are configured to determine the movement of the transport plane along at least two orthogonal axes of movement, the at least two orthogonal axes of movement being in a single plane, the single plane being substantially horizontal, and
    wherein the one or more sliders are configured to selectively couple with the transit paths.

2. The apparatus as in claim 1, further comprising a feed and/or discharge conveyor belt configured to cooperate at least temporarily with the transport plane.

3. The apparatus as in claim 1, wherein the transport plane is configured to cooperate at least temporarily with the one or more sliders to move the containers from and toward the machines or user devices.

4. The apparatus as in claim 1, wherein the transit paths are configured to allow displacement of the transport plane from one machine or user device to another.

5. The apparatus as in claim 1, wherein the one or more sliders are retractable with respect to a lower surface of the transport plane, to selectively couple with a corresponding transit path as a function of the direction of movement to be followed.

6. The apparatus as in claim 1, wherein the one or more sliders comprise pairs of movement sliders disposed with their operating directrixes angled, consistent with the geometric development of the two orthogonal axes of movement of the transit paths.

7. The apparatus as in claim 1, wherein the transit paths develop in a first linear direction and also in directions angled thereto.

8. The apparatus as in claim 1, wherein for each direction of movement of the transport plane, pairs of lateral transit paths are provided that cooperate with the one or more sliders provided below, near the sides of the transport plane.

9. The apparatus as in claim 1, wherein the one or more sliders are located near the tops of the lower surface of the transport plane.

10. The apparatus as in claim 1, wherein for each direction of movement of the transport plane a single central transit path is provided, associated below the transport plane.

11. The apparatus as in claim 10, wherein the one or more sliders of the transport plane cooperate with two central transit paths that intersect are in turn positioned in a configuration with the respective operating directrixes reciprocally angled.

12. The apparatus as in claim 10, wherein pairs of support bars are provided, cooperating in sliding support with the sides of each transport plane opposite the corresponding central transit path.

13. The apparatus as in claim 1, wherein the transport plane is associated with a loading device to load the containers onto the transport plane.

14. The apparatus as in claim 1, wherein the transport plane is configured able to be at least partly divided into two, having an upper part, positionable angularly, or linearly, with respect to a base or lower component.

15. A plant comprising a plurality of machines or user devices to receive or supply containers containing substances, comprising a movement apparatus according to claim 1.

* * * * *